United States Patent [19]

Schleicher et al.

[11] Patent Number: 5,750,135
[45] Date of Patent: May 12, 1998

[54] STABILIZED FEED ADDITIVE AND PROCESS FOR THE PREPARATION THEREOF

[75] Inventors: Werner Schleicher, Bigen/Rhein; Herbert Werner, Ingelheim am Rhein, both of Germany

[73] Assignee: Boehringer Ingelheim Vetmedica GmbH, Ingelheim am Rhein, Germany

[21] Appl. No.: 287,577

[22] Filed: Aug. 9, 1994

Related U.S. Application Data

[63] Continuation of Ser. No. 914,685, Jul. 15, 1992, abandoned, which is a continuation of Ser. No. 759,709, Sep. 12, 1991, abandoned, which is a continuation of Ser. No. 624,510, Dec. 7, 1990, abandoned, which is a continuation of Ser. No. 227,202, Aug. 1, 1988, abandoned.

Foreign Application Priority Data

Aug. 5, 1987 [DE] Germany ............................ 3725946.6

[51] Int. Cl.⁶ .................... A23K 1/165; A61K 47/00; A61K 9/00; A61K 38/12

[52] U.S. Cl. .......................... 424/442; 424/400; 424/439; 530/320; 530/304; 514/9

[58] Field of Search ........................ 530/304, 320, 530/317; 514/9; 424/400, 439, 442

[56] References Cited

U.S. PATENT DOCUMENTS

| 4,096,246 | 6/1978 | Oystese ................... 424/177 |
|---|---|---|
| 4,164,572 | 8/1979 | Oystese ................... 424/177 |
| 4,218,437 | 8/1980 | Hiller ..................... 424/94 |
| 4,320,584 | 3/1982 | Hüttlin ................... 34/57 A |
| 4,645,520 | 2/1987 | Hüttlin ................... 55/302 |

FOREIGN PATENT DOCUMENTS

| 0165577 | 6/1985 | European Pat. Off. ......... A23K 1/17 |
|---|---|---|
| 0302462 | 8/1988 | European Pat. Off. ......... A23K 1/00 |

*Primary Examiner*—Avis M. Davenport
*Attorney, Agent, or Firm*—Robert P. Raymond; Alan R. Stempel; Mary-Ellen Devlin

[57] ABSTRACT

The invention relates to a stabilized feed additive, more particularly containing zinc bacitracin, and processes for the preparation thereof.

13 Claims, No Drawings

STABILIZED FEED ADDITIVE AND PROCESS FOR THE PREPARATION THEREOF

This is a continuation of application Ser. No. 914,685, filed Jul. 15, 1992 and now abandoned, which is a continuation of application Ser. No. 759,709, filed Sep. 12, 1991, now abandoned, which is a continuation of application Ser. No. 624,510, filed Dec. 7,1990, now abandoned, which is a continuation of application Ser. No. 227,202, filed Aug. 1, 1988, now abandoned.

The invention relates to a feed additive which, when mixed with a feed, has improved stability to the effects of heat and moisture and mechanical treatment, with the result that the additive contained in the feed retains its biological activity even after lengthy storage, possibly under unfavourable conditions.

Feed additives used in the field of animal husbandry are, for example, the so-called efficiency enhancer which are added in small doses to the feed and result in better feed utilization and an increased daily weight gain. Apart from the efficiency enhancers it is also conventional to add drugs to the feed. Within the scope of the invention, these compounds are also referred to as feed additives.

A particularly useful feed additive is zinc bacitracin, a cyclic polypeptide which is relatively stable in both solid and dissolved form. In feed mixtures, zinc bacitracin is substantially more unstable, due partly to the effects of heat and moisture during pelleting of the feed and the mechanical stresses produced during the process of mixing the feed additive with the feed, and partly to reactions with the heavy metals present in the feed, such as copper and iron, and with organic compounds such as fats, ascorbic acid, etc.

Numerous attempts have been made to stabilize zinc bacitracin in feed mixtures in order to overcome these disadvantages. However, until now no satisfactory solution to the problem of the reduction in the content of zinc bacitracin under normal and, particularly, under unfavourable processing and storage conditions, has been found, with the result that the risk of overdosing "just in case", caused by uncertainty as to the amount of zinc bacitracin present, could not be ruled out. From more recent literature, a process is known from European Patent Application No. 165 577 in which the zinc bacitracin is coated with a polymer by the so called fluidized bed granulation method. In spite of the good results of this process, it has been found that the solution proposed is not entirely satisfactory under all conditions. Tests have shown that the durability of the product depends to a considerable extent on the feed mixture used. Mineral feed mixtures and pelleted broiler feed, for example, are regarded as particularly critical.

The aim of the present invention is to provide a feed additive which is sufficiently stable during the processing and storage of the feed even in the so called critical feeds.

According to the invention, the problem is solved by using a feed additive coated by the so called air controlled granulating system (SKD). In the SKD process, the powdered starting material is completely coated with the coating material in a air controlled granulating system (e.g. HSP-5/10 made by Huttlin, of Steinen). The technical equipment for performing the process is disclosed in German Patent 29 32 803 (equivalent to U.S. Pat. No. 4,320,584) and in European Patent 146 680 (equivalent to U.S. Pat. No. 4,645,520). Surprisingly, it has been found that a feed additive provided with a coating using the apparatus described therein has substantially better stability than a preparation which has been coated in a conventional fluidized bed granulator.

Other advantages over conventional preparations are that the preparation according to the invention has a very narrow range of particle sizes, which can be adjusted within wide limits, that the preparation has better flow ability and that the odor of strong-smelling starting products is greatly suppressed.

The coating materials used may be the compounds used as coating materials in pharmaceutical preparations, such as polyacrylates, polyacrylic acids, polyacrylic esters, polyacrylamides, polysaccharides, inorganic coating materials such as silicates or carbonates, provided that they are soluble or readily suspendable in water or volatile organic solvents or mixtures of solvents. If the feed additive is not zinc bacitracin, fats, lipids, lecithin and water may also be used as coating materials. Other suitable inorganic coating materials include the following compounds: bentonite, montmorillonite, calcium silicate, kaolinite clays, kieselgur, silicic acids (precipitated and dried), sodium aluminium silicate, silicon dioxide, perlite and vermiculite. Suitable coating materials of a basic nature include, for example, calcium hydrogen orthophosphate, calcium oxide, calcium tetrahydroorthophosphate, diammonium hydrogen orthophosphate, dicalcium diphosphate, disodium dihydrogen diphosphate, disodium hydrogen orthophosphate, potassium dihydrogen orthophosphate and/or sodium dihydrogen orthophosphate.

Preferred coating materials include celluloses, particularly hydroxypropylmethylcellulose, sodium carboxymethylcellulose, hydroxyethylcellulose and methylcellulose. Ethylcellulose, cellulose acetate phthalate, cellulose acetate succinate, hydroxypropylmethylcellulose phthalate, polyvinylacetate, polyvinyl-pyrrolidones, alginic acids, polyethylene glycols, hexadecyl alcohols, and hydroxypropylcellulose are also suitable. The coating material may be made up of a mixture of the compounds mentioned above. Feed additives which may be used in the sense of the invention are preferably the following compounds: virginiamycin, tylosin, spiramycin, nosiheptide, penicillins, chlorotetracyclins, oxytetra-cyclins, tetracyclins, erythromycins, furazolidone, nitrofuran, trimethoprim, sulphonamides, dimetridazole and neomycin base.

Zinc bacitracin is of special interest.

Those feed additives which are prepared by a biological process are usually mixed with a carrier material, e.g. calcium carbonate. Both the preparation and the isolation of these compounds are known in the art and require no further explanation.

The content of coating material is between 2.5 and 30% by weight, preferably 4 to 20% by weight, more particularly 5 to 10% by weight, based on the starting material used including any carrier material which may be used. It goes without saying that even if a larger quantity of coating material is used the feed additive according to the invention is stabilized, although it is within the scope of the invention to keep the quantity of coating material as small as possible. Generally, the starting material consists of about 25% zinc bacitracin and carrier substances to make it up to 100%. The preparation according to the invention is prepared by the following process:

The powdered starting material, for example having a particle size of between 1 and 60 micrometers is placed in the air controlled granulating system mentioned hereinbefore. The air flowing into the layer of powder through the rotating slots fluidizes the product. Then an approximately 3 to 10%, preferably 5 to 10% solution or suspension of the coating material which is used as the granulating liquid is sprayed into these fluidizing zones and into the fluidized bed from below. The individual parameters of the process, such as the quantity of air supplied, the temperature of the air supplied, the temperature of the exhaust air, the humidity of the exhaust air, the diameter of the spray nozzles, the spraying rate and the speed of rotation of slot/nozzle depend inter alia on the size of the apparatus used. Specific information on these points appears in the Examples. If desired, the reaction may be carried out under an inert gas such as nitrogen.

The entire process time is much shorter than in conventional granulation processes, e.g. the fluidized bed method. A further advantage is that not only is the preparation granulated but the coating surrounds the starting material entirely to form a complete covering. The difference from conventional granulation methods in which the coating is incomplete can be demonstrated by photographs taken with a scanning electron microscope.

Because of the very smooth surface the product according to the invention has very good flow qualities. The feed additive prepared by the process according to the invention exhibits a typical, relatively narrow distribution of particle sizes. FIGS. I and II show the particle size distribution of the feed additive zinc bacitracin, by way of example. In conventional fluidized bed granulation, a spectrum of this kind can only be achieved after repeated screening and mixing. Compared with conventionally prepared products, the product according to the invention shows virtually no content of fine dust and no abrasion. The feed additives prepared by the SKD method exhibit no detectable abrasion of active substance in the Stauber-Heubach test (Fresenius, Z. Anal. Chem. (1984) 318: 522-524). Table I shows the results for typical mixing batches. It is particularly worth noting that no zinc bacitracin can be detected in the so called fine dust fraction. This eliminates the risk of the feed additive endangering the health of those people working with the feed mills in the course of their work. Another advantage of the granulated product thus prepared is in its prevention of dust explosions which often constitute a risk when finely powdered substances are present.

The properties listed amount to major advantages in the processing of the feed additive, e.g. when it is mixed with the feed and the feed is pelleted.

The improved durability of the feed additive in the finished feed mixture is particularly advantageous in pelleted feed mixtures. During pelleting, the feed is briefly exposed to high temperatures (up to 140° C.), moisture (hot steam) and pressures. Experience has shown that these have a very detrimental effect on the durability of the feed additive in terms of its biological activity.

The feed additive according to the invention, particularly containing zinc bacitracin, is generally added to the feed in a concentration of between 20 and 1000 ppm.

The invention is hereinafter explained more fully with reference to zinc bacitracin as an example of a feed additive. Preparation of stabilized zinc bacitracin granules using the air controlled granulating system (SKD).

EXAMPLE 1

Composition:

95.0 g of zinc bacitracin (min. 21.1%)
5.0 g methyl cellulose 100.0 g zinc bacitracin granulate Method The powdered starting material zinc bacitracin with a particle size of from 1-40-micrometers (main fraction: 10-15 micrometers) is placed in the SKD. A 5% methyl cellulose solution is prepared, to be used as the granulating liquid. The air flowing into the layer of powder through the rotating slots fluidizes the product and the granulating liquid is then sprayed into this fluidizing zone from below.

Parameters of the process

Quantity of air supplied: 150-250 m³/h

Temperature of air supplied: 60°-70° C.

Diameter of spray nozzle: 1.2 mm Average spray rate: 18 ml/min Speed of rotation slot/nozzle: 3 rpm The total spraying time is about 155 min. and the drying phase about 25 min. The total process time is therefore about 180 min. By comparison, the total process time for a zinc bacitracin granulate prepared in a conventional fluidized bed granulator (e.g. WSG 200, Glatt) is more than 8 hours, and additional screening and mixing are required because of the large secondary agglomerates and broad spectrum of particle size distribution.

After only 15 minutes the formation of the granules can be detected. The granulating phase merges, presumably smoothly, into a coating phase in which the granules formed initially are gradually coated with methyl cellulose. Photographs taken with a scanning electron microscope with a magnification of 600/1800 show surfaces of different degrees of smoothness in two samples coated with 5.14% and 9.48% of methyl cellulose, respectively, the higher coating concentration producing the smoother surface.

The end product produced by SKD contains virtually no fine dust (particles smaller than 45 micrometers=0%) and has a narrow spectrum of particle size distribution (particles from 200-400 micrometers=92%). Consequently, the granules have a good flow ability (angle of float: 33.60°, nozzle opening 6 mm, flow time for 200 ml: about 75 seconds).

EXAMPLE 2

The same as Example 1 but with the following process parameters

Quantity of air supplied: 80-150 m³/h

Temperature of air supplied: 90°-1000° C.

Average spray rate: 50-200 g/min

Speed of rotation slot/nozzle: 3-5 rpm

Compared with the process according to the invention, screen analysis (CH.-B.: 409 105) of a zinc bacitracin preparation produced by the conventional method shows a very broad spectrum of particle size distribution from less than 63 micrometers to more than 1,000 micrometers, with the main fraction of about 80% falling between 355 and 1,000 micrometers, in spite of the screening off of the coarser fractions. A fine dust content of 2.3% (particle size less than 63 micrometers) is also noticeable, which makes the product unpleasant to handle and constitutes a risk during use. The unfavourable particle size distribution results in overall worse flow qualities compared with SKD granulates. In the measuring apparatus used for the flow qualities (PTG flow tests, F. Pharmatest) the WSG granules cannot be measured with the outlet nozzles of 4 or 6 mm in diameter normally used, because the nozzles become clogged up. The WSG granules are only free-flowing from a nozzle diameter of 8 mm upwards, although the flow properties are subject to extreme fluctuations.

Stabilization of the active substance zinc bacitracin is achieved with the process according to the invention. After being mixed with standard commercial feeds, even after pelleting, this active substance shows excellent stability compared with a feed containing untreated powdered zinc bacitracin, for the periods of use envisaged (3 to 4 months in the case of Germany). The granules prepared by the conventional fluidized bed method do not achieve the same good chemical stability in pelleted feed as the SKD granules, even with a content of 20% of coating material.

TABLE 1

Recovery rate of zinc bacitracin (ZBA) in % (percent) various feeds (storage at ambient temperature). Initial content of zinc bacitracin: 1,000 ppm = 100%

| Zinc baci-tracin | Time in weeks | Types of meal feed | | | | Types of pellet feed | | |
|---|---|---|---|---|---|---|---|---|
| | | 2.6 | 2.16 | 7.4 | 7.7 | 2.6 | 7.4 | 7.7 |
| Untreated control | | | % ZBA | | | | % ZBA | |
| | 1.5 | 116.4 | 94.6 | 89.8 | 96.5 | 90.5 | 67.5 | 81.5 |
| | 4 | 107.6 | 91.2 | 82.9 | 98.8 | 75.7 | 40.2 | 65.8 |
| | 6 | 93.1 | 68.5 | 66.2 | 86.4 | 48.8 | 24.9 | 51.1 |
| | 8 | 83.3 | 73.7 | 51.9 | 80.4 | 40.8 | 21.4 | 42.4 |
| Granulated in the SKD with 5% methyl cellulose | | | | | | | | |
| | 1.5(2)* | 102.3 | 96.2 | 108.3 | 107.6 | 91.4 | 98.9 | 100.8 |
| | 5(6)* | 104.3 | 95.1 | 103.3 | 100.8 | 85.5 | 85.6 | 97.1 |
| | 10(12)* | 102.2 | — | 96.7 | 105.6 | 89.7 | 59.1 | 82.6 |
| | 12(13)* | 105.0 | 90.2 | 104.4 | 97.6 | 81.2 | 54.8 | 80.0 |
| | 17 | — | 89.4 | — | — | — | — | — |

Types of feed:
2.6 complete feed for fattening pigs
2.16 mineral supplement
7.4 complete feed for fattening chicks
7.7 complete feed for laying hens

*Values in parenthesis refer to types of pellet feed, storage in weeks.

TABLE II

Stauber Heubach Test/Operator Safety

| | Batch | |
|---|---|---|
| | A | B |
| Fine dust (mg/50 g of premix) | 0.20 | 0.27 |
| Zinc bacitracin (mcg/50 g of premix) | n.d. (<1 mcg) | n.d. (<1 mcg) |
| X (A/B) 0.24 (Fine dust/50 g of premix) ZBa: n.d. | | |
| ± s  0.049 | | |

Coating material: methyl cellulose
x = mean value, s = standard deviation
nd = not detectable ZBa = zinc bacitracin

What is claimed is:

1. A process for producing a coated feed additive for use in animal husbandry, wherein the feed additive is selected from the group consisting of virginiamycin, tylosin, spiramycin, nosiheptide, penicillins, zinc bacitracin, chlorotetracyclins, oxytetracylins, tetracyclins, erythromycins, furazolidone, nitrofuran, trimethoprin, sulphonamides, dimetridozole, and neomycin base, the process which comprises introducing the feed additive in powder form into an air controlled granulating system to fluidize the feed additive powder and spraying the fluidized feed additive powder with a liquid coating material to produce granules of the coated feed additive.

2. The process of claim 1 in which amounts between 2.5 and 30% by weight of the coating material, based on the feed additive used, is sprayed as a 3 to 10% solution or suspension.

3. The coated feed additive produced by the process of claim 2.

4. The process of claim 2 in which the feed additive comprises zinc bacitracin.

5. The coated feed additive produced by the process of claim 4.

6. The coated feed additive of claim 5 in which the concentration of zinc bacitracin is between about 20 and about 1000 ppm.

7. The coated feed additive of claim 5 in which the coating material is a polymer selected from the group consisting of polyacrylates, polyacrylic acids, polyacrylic esters, polyacrylamides, polysaccharides, polyvinyl acetate, polyvinylpyrrolidones, polyethylene glycols and mixtures thereof.

8. The coated feed additive of claim 5 in which the coating material is a silicon containing compound selected from the group consisting of bentonite, montmorillonite, calcium silicate, kaolinite clays, kieselgur, silicic acids, sodium aluminum silicate, silicon dioxide, perlite, vermiculite and mixtures thereof.

9. The coated feed additive of claim 5 in which the coating material is a cellulose containing compound selected from the group consisting of hydroxypropylmethyl cellulose, sodium carboxymethyl cellulose, hydroxyethyl cellulose, methyl cellulose, ethyl cellulose, cellulose acetate phthalate, cellulose acetate succinate, hydroxypropylmethyl cellulose phthalate, hydroxypropyl cellulose and mixtures thereof.

10. The coated feed additive of claim 9 which the coating material is methyl cellulose.

11. A feed for use in animal husbandry which comprises a mixture of the coated feed additive of claim 1 and a mineral feed mixture or a pelleted broiler feed.

12. A feed for use in animal husbandry which comprises a mixture of the coated feed additive of claim 5 and a mineral feed mixture or a pelleted broiler feed.

13. A feed for use in animal husbandry which comprises a mixture of the coated feed additive of claim 10 and a mineral feed mixture or a pelleted broiler feed.

* * * * *